(12) United States Patent
Burr et al.

(10) Patent No.: US 8,484,549 B2
(45) Date of Patent: Jul. 9, 2013

(54) VISUALIZING DATA MODEL SENSITIVITY TO VARIATIONS IN PARAMETER VALUES

(75) Inventors: Brandon Burr, Palo Alto, CA (US); Derek Cicerone, Palo Alto, CA (US); Kevin Simler, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 303 days.

(21) Appl. No.: 12/479,554

(22) Filed: Jun. 5, 2009

(65) Prior Publication Data
US 2010/0306639 A1  Dec. 2, 2010

Related U.S. Application Data

(60) Provisional application No. 61/181,129, filed on May 26, 2009.

(51) Int. Cl.
 *G06F 17/00* (2006.01)
 *G06F 17/15* (2006.01)
 *G06F 17/17* (2006.01)
 *G06F 17/18* (2006.01)

(52) U.S. Cl.
 USPC ............ 715/213; 715/219; 715/220; 715/227

(58) Field of Classification Search
 USPC .................. 715/212, 213, 217, 219, 220, 227
 See application file for complete search history.

(56) References Cited

U.S. PATENT DOCUMENTS

| | | | | |
|---|---|---|---|---|
| 6,349,315 B1 * | 2/2002 | Sonoyama et al. | ........... | 715/209 |
| 2006/0052984 A1 | 3/2006 | Nakadate et al. | | |
| 2008/0046803 A1 * | 2/2008 | Beauchamp et al. | ......... | 715/212 |
| 2009/0112922 A1 * | 4/2009 | Barinaga | .................. | 707/103 R |
| 2009/0138307 A1 * | 5/2009 | Belcsak et al. | .................... | 705/7 |
| 2010/0205108 A1 * | 8/2010 | Mun | ........................... | 705/36 R |
| 2010/0312530 A1 * | 12/2010 | Capriotti | ........................... | 703/2 |

OTHER PUBLICATIONS

V. Schwieger, "Variance-Based Sensitivity Analysis for Model Evaluation in Engineering Surveys," INGEO 2004 and FIG Regional Central and Eastern European Conference on Engineering Surveying, Nov. 11-13, 2004, published by INGEO, Bratislava, Slovakia, 2004, 10 pages.

V. Schwieger, "Sensitivity Analysis as a General Tool for Model Optimisation—Examples for Trajectory Estimation," 3rd IAG/12th FIG Symposium, Baden, Germany, May 22-24, 2006, published by IAG, 2006, 10 pages.

L. Breierova et al., "An Introduction to Sensitivity Analysis," published by Massachusetts Institute of Technology, Cambridge, MA, Oct. 2001, 67 pages.

* cited by examiner

*Primary Examiner* — Doug Hutton, Jr.
*Assistant Examiner* — Ariel Mercado
(74) *Attorney, Agent, or Firm* — Hickman Palermo Truong Becker Bingham Wong LLP

(57) ABSTRACT

In an embodiment, a computer-implemented method facilitates optimization analysis and sensitivity analysis of a data model. The method comprises a computer: receiving first data identifying a value function, a plurality of parameters for the value function, and one or more specific parameter values for one or more of the parameters; storing a data model based on the value function and the specific parameter values; determining which parameters of the data model are capable of taking variable values; receiving second data identifying one or more selected parameters; receiving third data specifying a value selection approach for each of the selected parameters; determining a plurality of result values by substituting, based on the value selection approach, a plurality of input values for each of the selected parameters and evaluating the value function using the selected parameters and the substituted values; generating and causing displaying a table of the result values.

39 Claims, 9 Drawing Sheets

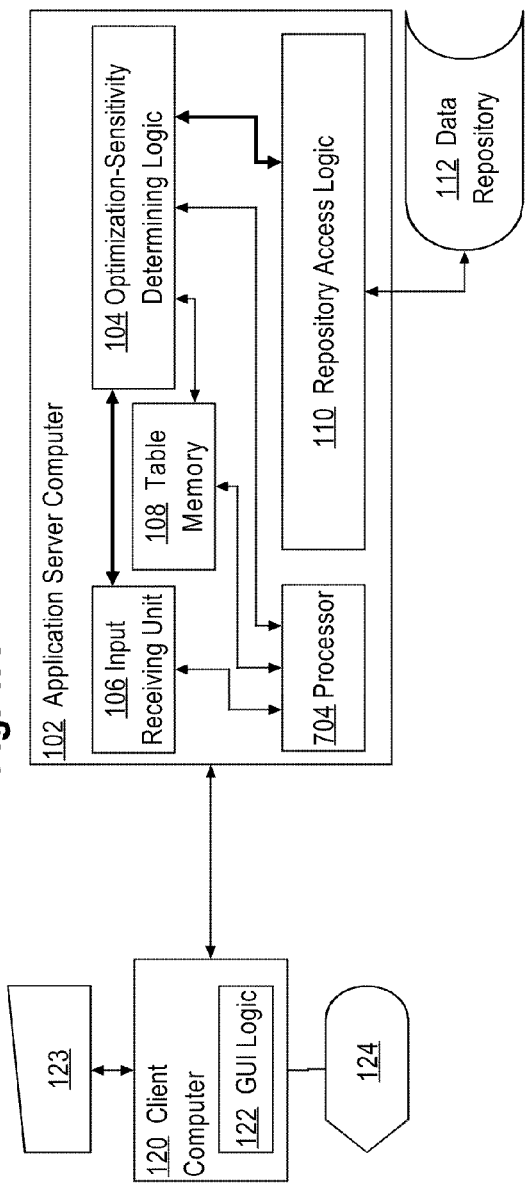
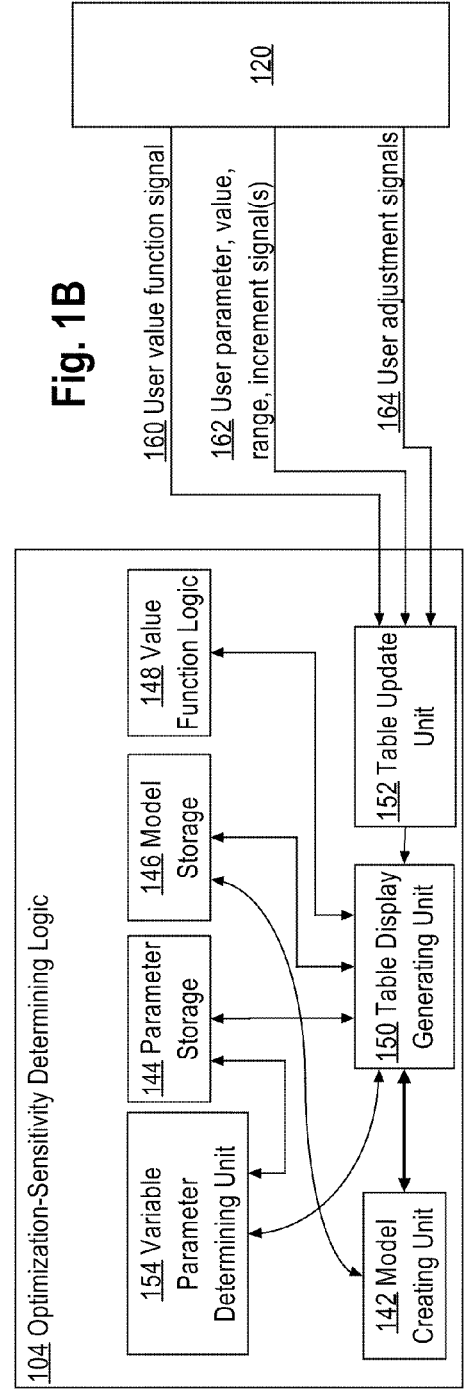

Fig. 6

| | | S&P 500 INDEX | | | | Google Inc | | | | Microsoft Corp | | | | Yahoo! Inc | | | |
|---|---|---|---|---|---|---|---|---|---|---|---|---|---|---|---|---|---|
| | | 78 | 79 | 80 | 81 | 82 | 78 | 79 | 80 | 81 | 82 | 78 | 79 | 80 | 81 | 82 | |
| 1.6 | true | -11.53 | -11.68 | -11.79 | -11.59 | -12.06 | -27.29 | -29.93 | -30.46 | -28.78 | -28.63 | -4.55 | -3.31 | -4.34 | -4.49 | -4.52 | 11.59 | 13.67 | 10.4 | 11.21 | 7.31 |
| | False | -9.88 | -10 | -10.13 | -9.92 | -10.53 | -25.85 | -28.54 | -29.08 | -27.38 | -27.23 | -1.97 | -0.86 | -2.04 | -2.19 | -2.35 | 14.1 | 16.24 | 12.86 | 13.68 | 9.51 |
| 1.8 | true | -13.6 | -13.64 | -13.6 | -13.46 | -12.92 | 32.7 | 32.01 | 29.98 | 28.57 | 28.89 | 8.43 | 7.65 | 7.27 | 7.27 | 5.37 | 5.98 | 5.25 | 2.56 | 1.09 | -1.54 |
| | False | -12.1 | -12.14 | -12.11 | -11.96 | -11.4 | -31.38 | -30.69 | -28.61 | -27.18 | -27.42 | -6.52 | -5.73 | -5.34 | -5.34 | -3.41 | 8.24 | 7.32 | 4.55 | 6.26 | 0.32 |
| 2.0 | true | -14.62 | -14.27 | -15.98 | -17.45 | -16.11 | -26.96 | -24.39 | -24.52 | -22.4 | -28.32 | -13.98 | -12.13 | -11.96 | -11.86 | -11.06 | 6.71 | 6.71 | 3.64 | 1.4 | 1.01 |
| | False | -13.19 | -12.83 | -14.66 | -16.25 | -14.78 | -25.55 | -22.88 | -22.96 | -20.82 | -26.91 | -12.33 | -10.46 | -10.29 | -10.19 | -9.38 | 8.72 | 8.72 | 5.55 | 3.27 | 2.86 |
| 2.2 | true | -17.49 | -17.96 | -18 | -17.54 | -17.49 | 34.01 | 33.34 | 33.34 | 32.04 | 32.04 | -6.68 | 5.95 | 5.78 | 5.78 | 4.64 | -2.44 | -2.44 | -6.24 | 14.43 | 14.37 |
| | False | -16.19 | -16.67 | -16.73 | -16.26 | -16.21 | -32.76 | -32.08 | -32.08 | -30.77 | -30.77 | -4.8 | 4.05 | -3.89 | -3.89 | -2.74 | -0.6 | -0.6 | -4.52 | 16.72 | 16.64 |
| 2.4 | true | -16.91 | -16.91 | -16.97 | -16.73 | — | -35.72 | -35.04 | -35.04 | -33.91 | -32.75 | -13.4 | -13 | -12.83 | -11.39 | -10.93 | -1.31 | 0.038 | -3.52 | -3.52 | -1.02 |
| | False | -15.59 | -15.59 | -15.66 | -15.41 | -18.57 | -34.58 | -33.9 | -33.9 | -32.75 | -32.75 | -11.86 | -11.47 | -11.29 | -9.83 | -9.37 | 0.55 | 1.92 | -1.74 | -1.74 | 0.87 |

602 series
Add item: ✓ YHOO

604 days
Low end value: 78
High end value: 82
Increment: 1

ƒx strategyAnnualizedReturn

606 stddev
Low end value: 1.60
High end value: 2.40
Increment: 0.200

608 Model transaction costs

VISUALIZING DATA MODEL SENSITIVITY TO VARIATIONS IN PARAMETER VALUES

BENEFIT CLAIM

This application claims the benefit under 35 U.S.C. 119(e) of prior provisional application 61/181,129, filed May 26, 2009, the entire contents of which are hereby incorporated by reference for all purposes as if fully set forth herein.

TECHNICAL FIELD

The present disclosure generally relates to data analysis including optimization of parameter values and sensitivity analysis for value functions, to special-purpose computers configured to perform such analysis, and to graphical user interface displays and display units configured to support such analysis.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2008-2009 Palantir Technologies, Inc.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Special-purpose programmed computers are used for many kinds of data analysis. Two particular areas in which computers are helpful in data analysis involves selecting optimal values for a data model, and determining whether a data model is particularly sensitive to changes in particular values. Performing these tasks typically involves repeatedly calculating and displaying different values for the data model or value function. While computers can be configured with logic to generate a graphical user interface, at present there is no approach known for conveniently and efficiently comparing values and identifying values that reveal special sensitivity of a model.

BRIEF DESCRIPTION OF THE DRAWINGS

In the drawings:

FIG. 1A illustrates a client computer and application server computer configured with optimization-sensitivity determining logic;

FIG. 1B illustrates an example of internal logic and functional units of the optimization-sensitivity determining logic;

FIG. 6 illustrates an example graphical user interface display generated by the optimization-sensitivity determining logic using a data model having four (4) parameters;

DETAILED DESCRIPTION

Figure 1C:
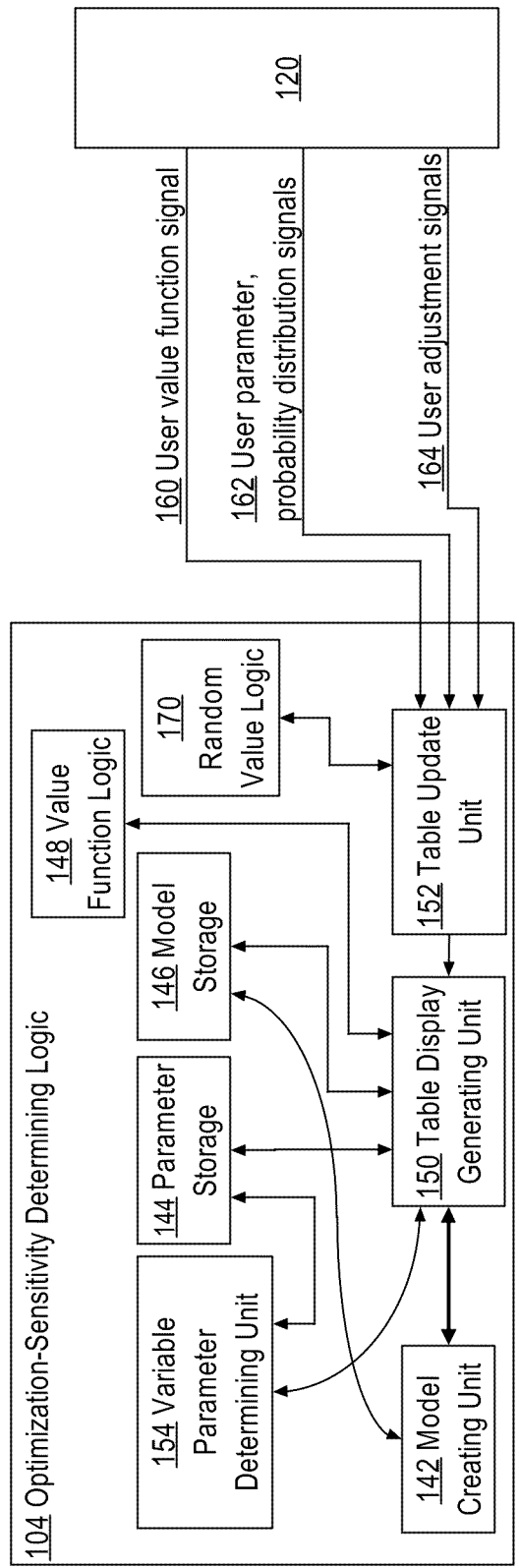
FIG. 1C illustrates another example of internal logic and functional units of the optimization-sensitivity determining logic.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

```
1.0 General Overview
2.0 Structural and Functional Overview
    2.1 Terms
    2.2 Structural Example
    2.3 Functional Example
    2.4 Randomized Selection of Parameter Values
3.0 Implementation Mechanisms-Hardware Overview
4.0 Extensions and Alternatives
```

1.0 General Overview

In various embodiments, the disclosure provides a computer-implemented method, as shown and described; a computer comprising optimization-sensitivity determining logic as shown and described; and a computer-readable data storage medium storing one or more stored sequences of instructions which, when executed by the processor, cause the processor to perform the functions that are shown and described. Embodiments provide a build-first, extract-parameters-later approach is implemented that makes performing optimization or sensitivity analysis on a particular model easier than in past approaches because a user is not required to specify all the parameters to consider for analysis in advance, and the user is not forced to create the data model with those parameters in mind.

In an embodiment, a computer-implemented method comprises a computer receiving first data identifying a value function, a plurality of parameters for the value function, and one or more specific parameter values for one or more of the parameters; the computer storing a data model based on the value function and the specific parameter values; the computer determining which parameters of the data model are capable of taking variable values; the computer receiving second data identifying one or more selected parameters; the computer receiving third data specifying a value selection approach for each of the selected parameters; the computer determining a plurality of result values by substituting, based on the value selection approach, a plurality of input values for each of the selected parameters and evaluating the value function using the selected parameters and the substituted values; the computer generating and causing displaying a table of the result values.

In an embodiment, the third data specifies an upper range value, a lower range value, and an increment value for at least one of the selected parameters. In an embodiment, the third data specifies one or more explicit or enumerated values for at least one of the selected parameters.

In an embodiment, the third data specifies a probability distribution for one or more of the selected parameters, and the value selection approach further comprises determining a pseudo-randomly generated number for the one or more of the selected parameters.

In an embodiment, the data model is created in an object-oriented financial analysis environment.

In an embodiment, wherein the selected parameters comprise two parameters, a first parameter is displayed in association with an X-axis of the table, and the second parameter is displayed in association with a Y-axis of the table.

In an embodiment, the selected parameters comprise three parameters, a first parameter is displayed in association with an X-axis of the table, the second parameter and third parameter are displayed in association with a Y-axis of the table, and the table comprises a plurality of cells each displaying two result values.

In an embodiment, the method further comprises causing displaying the table using at least two colors, wherein a first color denotes positive values and a second color denotes negative values.

In an embodiment, the method further comprises causing displaying the table using a plurality of cells each having different color saturation levels for each of the two colors, wherein each different color saturation level is associated with a different relative magnitude of a number in one of the cells. In an embodiment, each different color saturation level is proportional to a magnitude of the number in the cells.

In an embodiment, the method further comprises causing generating and displaying a notification identifying two adjacent cells in the table that have a greatest difference in magnitude of result values.

In an embodiment, a computer comprises one or more processors; table memory coupled to the one or more processors; repository access logic coupled to the one or more processors; optimization-sensitivity determining logic coupled to the one or more processors and comprising a model creating unit configured to receive first data identifying a value function, a plurality of parameters for the value function, and one or more specific parameter values for one or more of the parameters and to store a data model based on the value function and the specific parameter values; a variable parameter determining unit configured to determine which parameters of the data model are capable of taking variable values; a table display generating unit configured to receive second data identifying one or more selected parameters, to receive third data specifying a value selection mechanism for each of the selected parameters, to determine a plurality of result values by substituting, based on the value selection approach, a plurality of input values for each of the selected parameters and evaluating the value function using the selected parameters and the substituted values, and to generate and cause displaying a table of the result values.

In other embodiments, the invention encompasses other computer apparatus and a computer-readable medium configured to carry out the foregoing steps.

2.0 Structural and Functional Overview 2.1 Terms

In an embodiment, techniques are provided for generating and displaying a comparison table showing multiple output values of a data model based on a plurality of different values for one or more input parameters to the data model. In one embodiment, the data model, parameters, output values, and table are used, generated and displayed in the context of a computer comprising logic providing an object-oriented financial analysis environment. In other embodiments, the techniques herein may be applied in other environments, for analysis of chemical data, automotive data, environmental data, or data pertinent to many other domains of investigation.

In an embodiment, the following terms used in this disclosure have the following meanings:

1. A "model" is a coherent structure of values and calculations that mimics a real-world object at a certain level of description or abstraction. The real-world object may be a physical object such as a machine or electro-mechanical system, or an intangible object such as a financial product. An example of a model in the context of finance is a regression, which attempts to model, mimic or predict the value of a specific time series (the regressand) in terms of a linear combination of other time series (regressors), with an optional constant term, and a particular method for fitting the model, such as estimating the coefficients in the linear combination.

2. A "parameter" is an element of a model that can vary. The term "variable" is equivalent. In the case of a regression model, parameters could include (1) the particular set of regressors, (2) whether or not to include a constant term, and (3) the estimation method. In contrast, a model element that cannot be varied is the fact that the regressors must be time series. A "parameter" refers to a model element in terms of the abstract structure of the model, as opposed to its concrete instantiation with particular values for the parameters. The term "parameter value" refers to the particular value of a parameter. For example, if a parameter is the particular estimation method used in a model, then a parameter value might be [ordinary least squares].

In an embodiment, each parameter has an associated data type and can only be bound to values that fit the type. Many parameters are numeric parameters and the type of such parameters may be "real number," "double byte," or "integer." Other parameter types include Boolean type, which can hold a true or false value; enumerated types that can accept values selected from a predefined list; date types that can accept values specifying a calendar day and year; specific model types (such as Stock, Country, Index, or others that accept values identifying individual stocks, countries, indices, or others). Other embodiments may use other data types.

3. A "value function" is a computational function or logic element that receives a model as input and produces a single value, typically a number, as output. An example of a value function for a regression model is the "r-squared" function, which measures how well the model fits the data (regressand). A value function is especially useful for comparing related models.

4. An "optimization" is the process of searching for particular values for one or more parameters that maximize or minimize a particular value function. For example, a user could look for the three stocks (to use as regressors) that maximize the r-squared value of a regression model.

5. A "sensitivity analysis" is the process of determining how sensitive a particular model is to a particular parameter or parameters. Typically sensitivity is measured by determining how much the value of a value function changes in relation to changes in the value of the parameter.

An example illustrating use the terms above is now described. Assume that a model defines a synthetic market index named "Tech Index" having the data elements of TABLE 1:

TABLE 1

Example Market Index

Tech Index
    constituents (type: list of Stocks)
        MSFT
        GOOG
        YHOO
    start date (type: Date)
        1/1/2000
    weighting metric (type: Metric)
        hvol(100)
            days in window (type: Integer)
                100

The model of the example has three first-level parameters: "constituents," "start date," and "weighting metric." The values of the parameters are {MSFT, GOOG, YHOO}, Jan. 1, 2000, and hvol(100) respectively. Some of the values are themselves models, and some of those models have their own parameters. For example, the weighting metric "hvol" refers to a historical volatility function (metric) with a value of 100 for the parameter "days in window".

2.2 Structural Example

Figure 7:
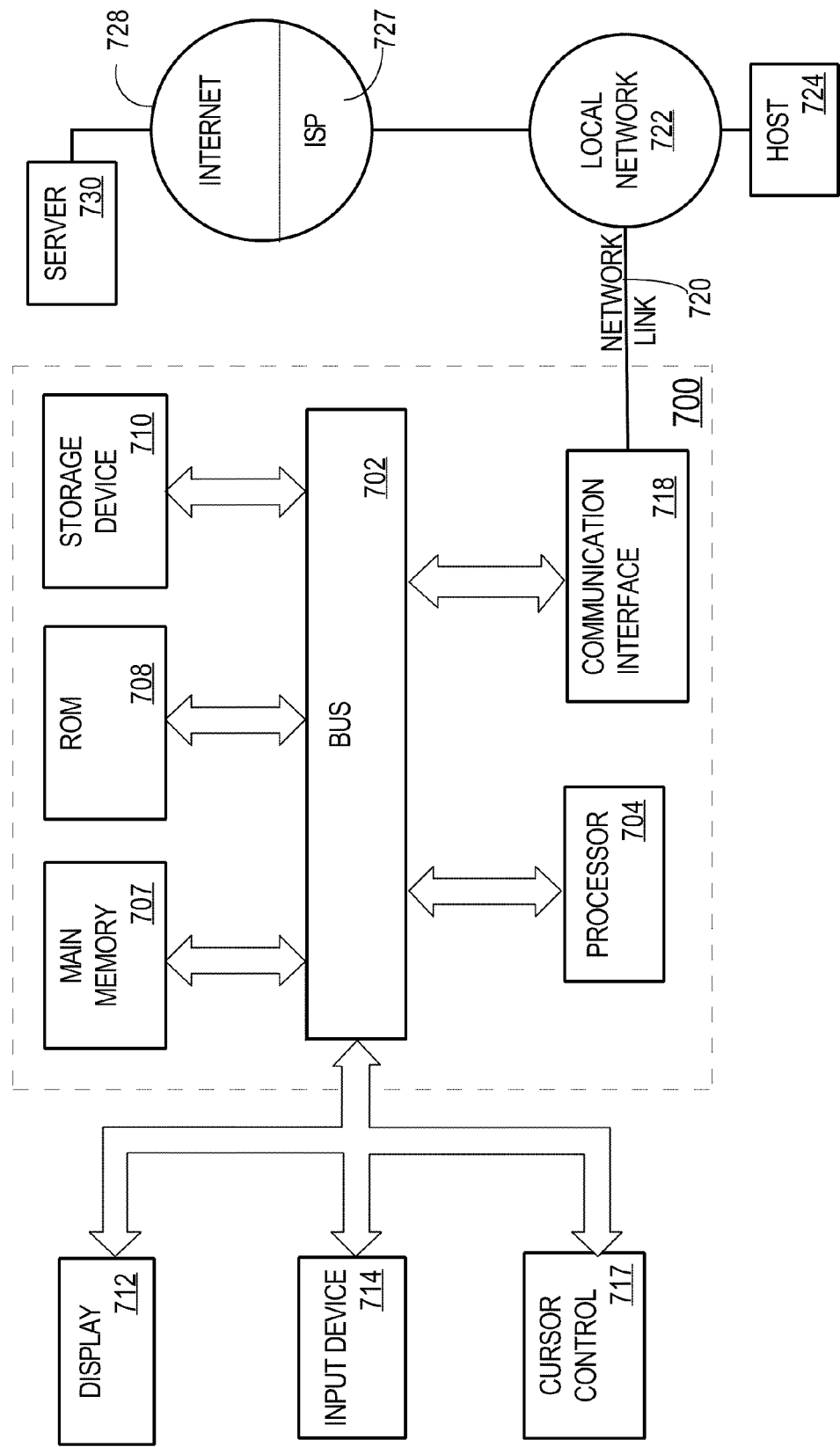
FIG. 7 illustrates a computer system upon which an embodiment may be implemented.

FIG. 1A illustrates a client computer and application server computer configured with optimization-sensitivity determining logic. FIG. 1B illustrates an example of internal logic and functional units of the optimization-sensitivity determining logic. Referring first to FIG. 1A, in an embodiment, a client computer 120 comprising GUI logic 122 is coupled to a data input unit 123 and to a display unit 124. The client 120, which may be implemented by one or more first physical computing devices, is communicatively connected to application server 102, which may be implemented by one or more second physical computing devices, over a network. In some embodiments, each such physical computing device may be implemented as a separate computer system as shown in FIG. 7. For example, client 120 may be implemented in a computer system as a set of program instructions recorded on a machine-readable storage medium, while application server 102 may be implemented in a different computer system.

Client 120 comprises graphical user interface (GUI) logic 122. GUI logic 122 may be a set of program instructions which, when executed by one or more processors of the computer system, are operable to receive user input and to display a graphical representation of one or more graphic constructs related to tracking a collective value of data items using the approaches herein. GUI logic 122 may be operable to receive user input from, and display the graphic constructs to, a graphical user interface that is provided on display 124 by the computer system on which client 120 executes.

In some embodiments, GUI logic 122 is omitted. For example, in one embodiment, client 120 may comprise an application program or process that issues one or more function calls or application programming interface (API) calls to application server 102 to obtain information resulting from, to provide input to, and to execute along with application server 102, the processes or one or more steps thereof as described herein. For example, client 120 may request and obtain a representation of a group of data items as described herein using a programmatic interface, and then the client may use, process, log, store, or otherwise interact with the received data according to local logic.

Client 120 may also interact with application server 102 to provide input, definition, editing instructions, expressions related to one or more dynamic indexes as described herein using a programmatic interface, and then the application server 102 may use, process, log, store, or otherwise interact with the received input according to application server logic.

Application server 102 may be implemented as a special-purpose computer system having the logical elements shown in FIG. 1. In an embodiment, the logical elements may comprise program instructions recorded on one or more machine-readable storage media. Alternatively, the logical elements may be implemented in hardware, firmware, or a combination.

When executed by one or more processors of the computer system, logic in application server 102 is operable to provide data analysis according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g. C++ or Visual Basic) and hardware components (e.g. memory, CPU time) that have been allocated for executing the program instructions.

In an embodiment, application server 102 comprises repository access logic 110 and dynamic indexing logic 104. Repository access logic 110 may comprise a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

In application server computer 102, a processor 704 is coupled to an input receiving unit 106, table memory 108, optimization-sensitivity determining logic 104, and repository access logic 110. In general, input receiving unit 106 is configured to receive input signals from client computer 120, determine whether the input signals relate to functions of the optimization-sensitivity determining logic 104, and provide the signals to logic 104 when appropriate. The table memory 108 is configured to receive and store data values associated with a comparison table useful in data analysis, selecting optimum data values for a data model, and sensitivity analysis. The data values stored in table memory 108 are generated by optimization-sensitivity determining logic 104 in response to particular user input signals as further described in other sections herein.

The optimization-sensitivity determining logic 104 is configured to receive signals specifying a data model, create and store the data model, receive signals identifying parameters for the model, receive values for parameters, generate and cause displaying a comparison table based in substituting different values into a value function associated with the model, and performing table updates, as detailed in other sections herein.

The repository access logic 110 is configured to receive requests for stored values in a data repository 112. Typically data repository 112 stores a large amount of data representing real-world objects such as machines, other manufactured articles, money, tradable instruments such as stock or derivative instruments, or any other tangible or intangible real-world object.

Each of the input receiving unit 106, optimization-sensitivity determining logic 104 and the internal elements thereof described for FIG. 1B, FIG. 1C, repository access logic 110, data repository 112, and GUI logic 122 may be implemented in various embodiments using a computer, one or more application-specific integrated circuits (ASICs) or other digital electronic logic, one or more computer programs, modules, objects, methods, or other software elements. For example, in one embodiment application server computer 102 may comprise a special-purpose computer having particular logic configured to implement the elements and functions described herein. In another embodiment, application server computer 102 may comprise a general purpose computer as in FIG. 7, loaded with one or more stored programs which transform the general purpose computer into a particular machine upon loading and execution. In either embodiment, optimization-sensitivity determining logic 104 can act upon and transform the state of data representing physical articles and non-physical real-world articles such as money or tradable instruments.

Referring now to FIG. 1B, in an embodiment, the optimization-sensitivity determining logic 104 comprises a model creating unit 142, parameter storage 144, model storage 146, value function logic 148, a table display generating unit 150, a table update unit 152, and a variable parameter determining unit 154. The table display generating unit 150 is generated to each other element of the optimization-sensitivity determining logic 104. The model creating unit 142 is coupled to the model storage 146. The variable parameter determining unit 154 is coupled to parameter storage 144. The table update unit 152 is coupled indirectly to client computer 120 and is capable of receiving user value function signals 160, user parameter, value, range, and increment signals 162, and user adjustment signals 164.

In operation, in an embodiment, an end user of client computer 120 causes the optimization-sensitivity determining logic 104 to create a data model in terms of specific, concrete values by providing one or more user value function signals to the model creating unit 142. Defining a data model may include specifying or providing the value function logic 148 or identifying previously existing value function logic to result in associating particular value function logic with the data model. The resulting data model is stored in model storage 146 and definitions of parameters of the data model are stored in parameter storage 144. Thus, at the end of the interaction of client computer 120 and model creating unit 142, a data model is stored in model storage 146, value function logic 148 is associated with the model or installed, and parameters for the data model are stored in parameter storage 144.

In an embodiment, a data model comprises a strategy. A strategy might be defined by user signals indicating a single value for each of the parameters of the strategy and a single value for the annualized return of the strategy.

In an embodiment, optimization-sensitivity determining logic 104 then receives a user signal indicating a request to perform an optimization-sensitivity analysis of the data model. In response, table display generating unit 150 generates and causes displaying, on display unit 124 of client computer 120, a data value comparison table having the general form shown in FIG. 3. To generate the display, table display generating unit 150 signals the variable parameter determining unit, which reads or queries the parameter storage 144 associated with the current data model and determines which parameters of the current data model are capable of receiving variable values. In an embodiment, the parameters of the model that can receive variable values are displayed on the left side of the screen display of FIG. 3.

In an embodiment, the end user decides which value function to use for performing optimization analysis or sensitivity analysis. Using data input device 123, the end user causes client computer 120 to generate a user value function signal 160 to table update unit 152. In response, the table update unit 152 associates a particular value function of value function logic 148 with the model.

The end user then decides which parameters to vary, and causes client computer 120 to generate one or more user parameter signals 162 to table update unit 152. In response, table update unit 152 causes re-generating the display of FIG. 3 to show representations of the parameters in label regions of the top of the table or right side of the table.

The end user operates client computer 120 to provide one or more ranges and increments for each of the parameters. Client computer 120 generates one or more additional user value, range, or increment signals 162 to table update unit 152. In response, table update unit 152 causes re-generating the display of FIG. 3 to show representations of the values, ranges or increments in the label regions and in association with related parameters.

The table update unit 152 also signals the table display generating unit 150 and in response, a comparison table of value-function values is produced and caused to be displayed on display unit 124 in cooperation with GUI logic 122.

Figure 8:
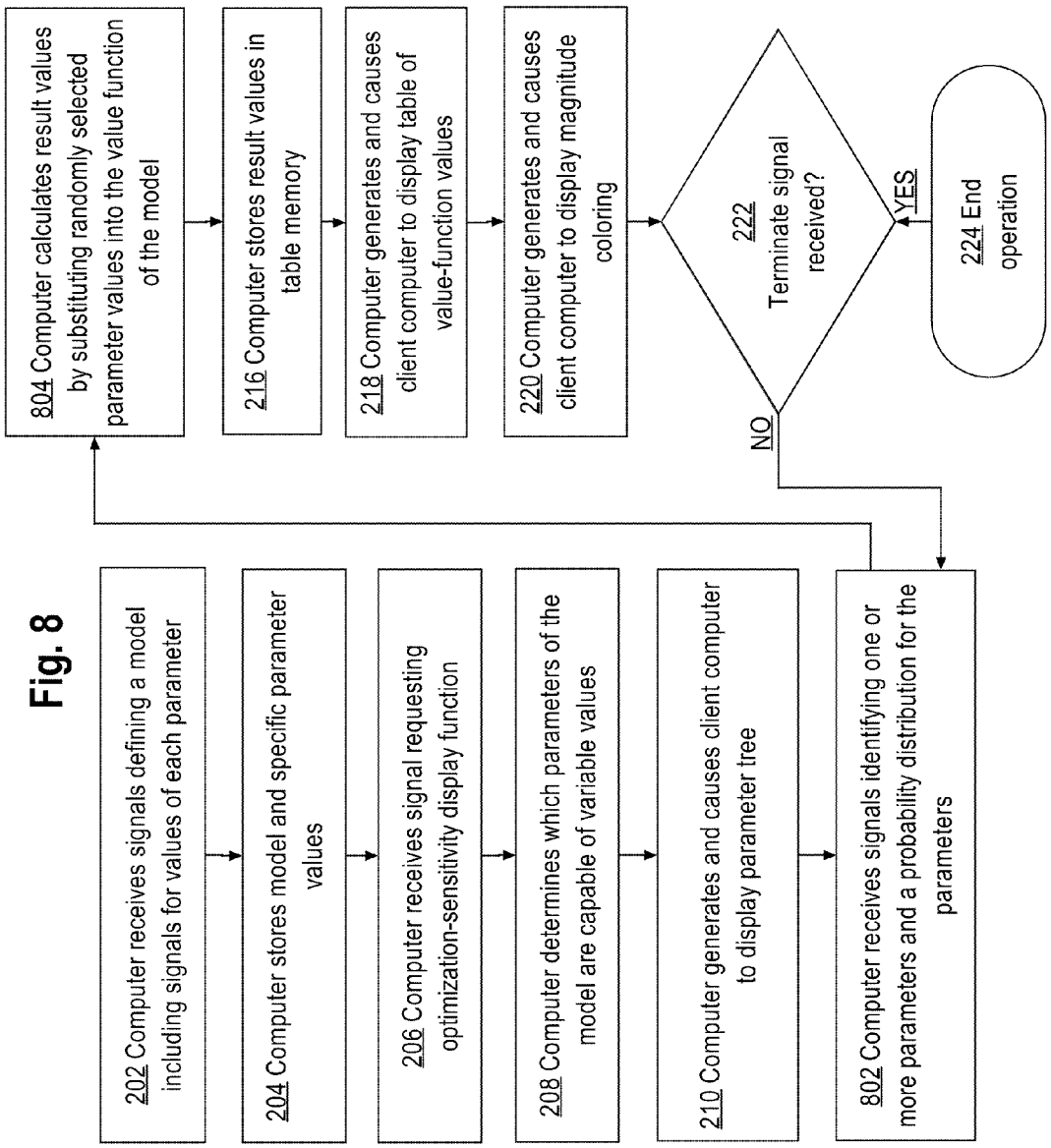
FIG. 8 illustrates a machine-implemented method of generating and displaying a comparison table of values of a data model using random values that are automatically selected based on a probability distribution.

In other embodiment, signals 162 do not include range and increment signals. For example, signals providing only explicit or enumerated values may be received. In another embodiment described in a subsequent section in connection with FIG. 1C and FIG. 8, random value substitution is facilitated using a random number generator and a probability distribution signal, which are used in place of value, range, and increment signals 162. In either FIG. 1B or FIG. 1C, the optimization-sensitivity determining logic 104 may include a plurality of value selection mechanisms configured to receive different kinds of input signals and to determine how to select values for substitution into the value function logic 148. One example of a value selection mechanism is logic configured to receive range values and an increment value for a parameter. Another example of a value selection mechanism is logic configured to receive explicit or enumerated values for a parameter. Another example, described further for FIG. 1C and FIG. 8, is logic configured to receive a probability distribution signal for a parameter and then using random number generation in step 214 to select and substitute values.

2.3 Functional Example

Figure 2:
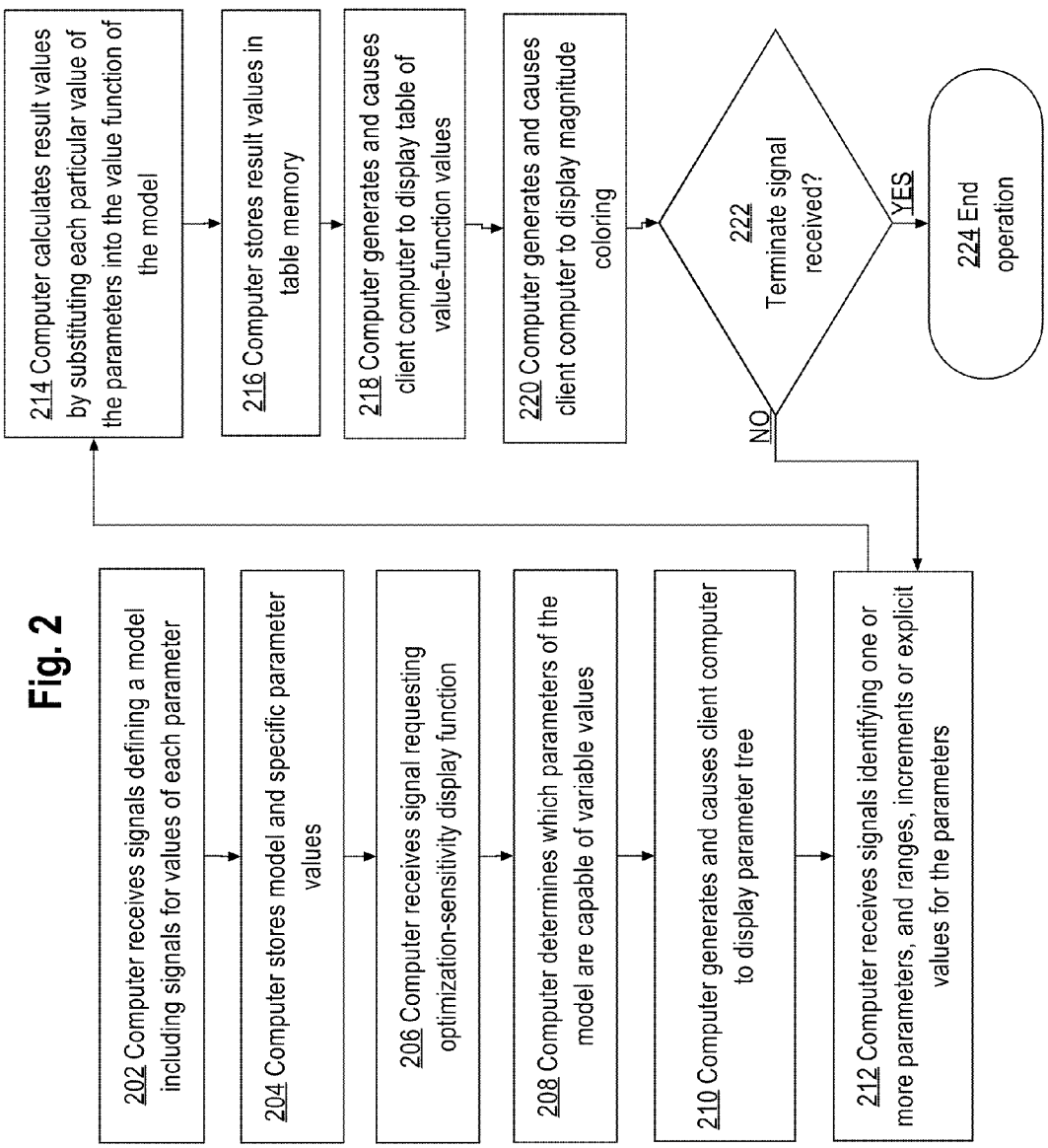
FIG. 2 illustrates a machine-implemented method of generating and displaying a comparison table of values of a data model.
Figure 3:
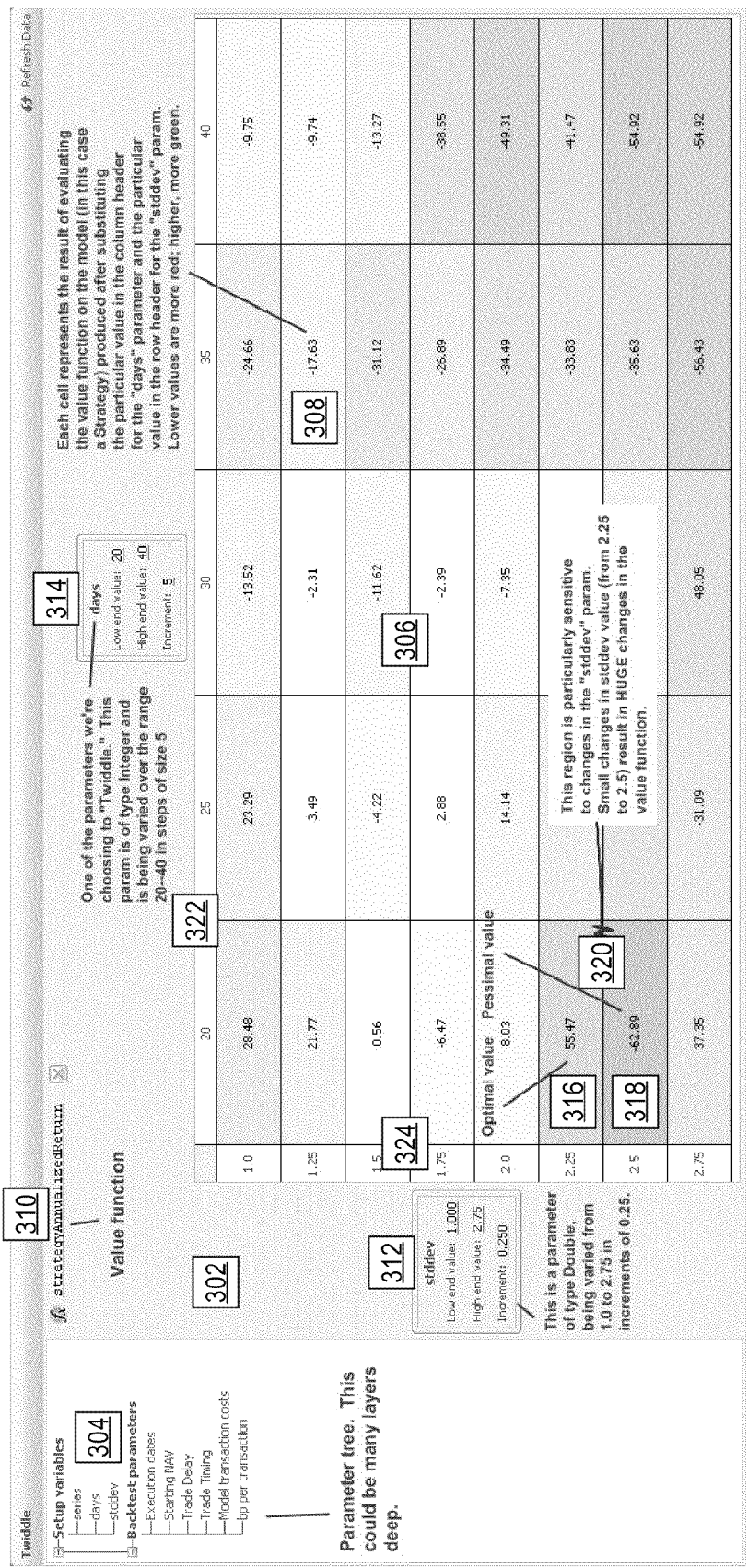
FIG. 3 illustrates an example graphical user interface display generated by the optimization-sensitivity determining logic using a data model having two parameters each having a range and increment.
Figure 4:
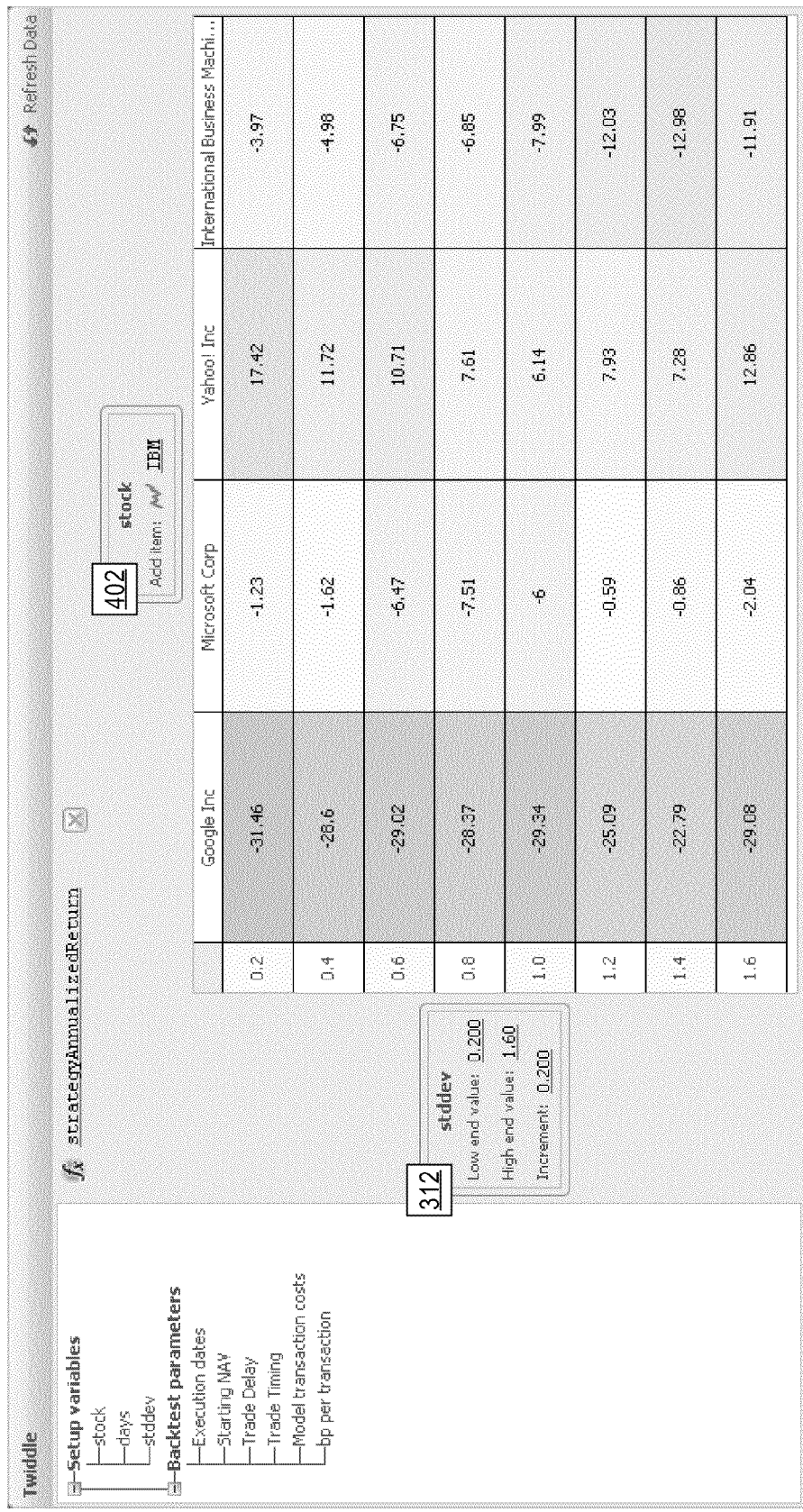
FIG. 4 illustrates an example graphical user interface display generated by the optimization-sensitivity determining logic using a data model having a first parameter with a range and increment and a second parameter having an explicit value.
Figure 5:
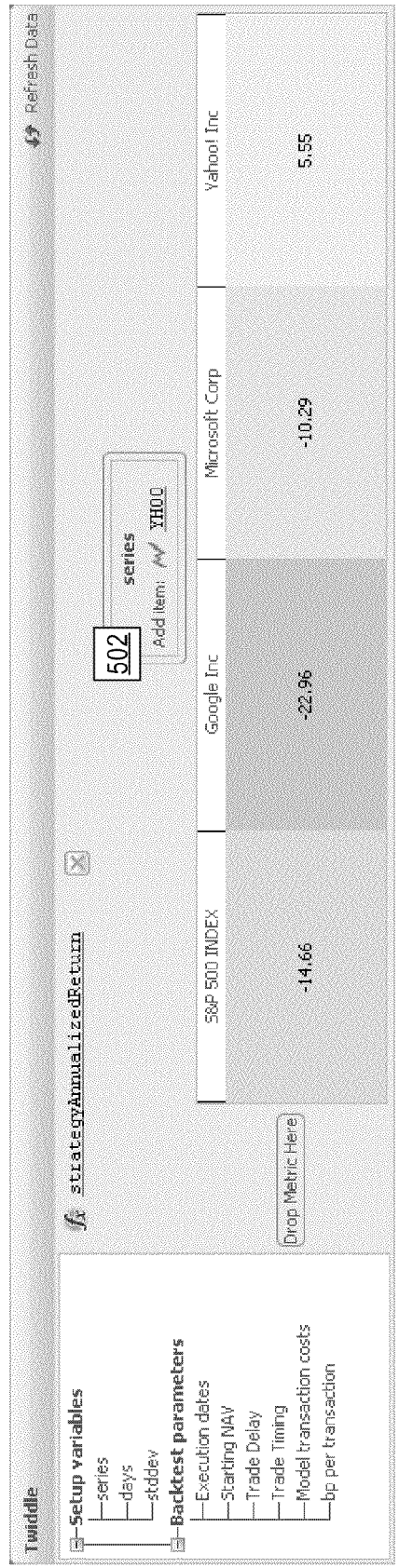
FIG. 5 illustrates an example graphical user interface display generated by the optimization-sensitivity determining logic using a data model having a single parameter.

FIG. 2 illustrates a machine-implemented method of generating and displaying a comparison table of values of a data model; FIG. 3 illustrates an example graphical user interface display generated by the optimization-sensitivity determining logic using a data model having two parameters each having a range and increment; FIG. 4 illustrates an example graphical user interface display generated by the optimization-sensitivity determining logic using a data model having a first parameter with a range and increment and a second parameter having an explicit value; FIG. 5 illustrates an example graphical user interface display generated by the optimization-sensitivity determining logic using a data model having a single parameter; FIG. 6 illustrates an example graphical user interface display generated by the optimization-sensitivity determining logic using a data model having four (4) parameters. Referring first to FIG. 2, in step 202, a computer receives signals defining a data model including signals for particular values of each parameter of the data model. For example, an end user interacts with client computer 120, using input device 123, GUI logic 122 and display unit 124, to create or define a Strategy in terms of specific, concrete values. This Strategy has a single value for each of its parameters, has a single value for its annualized return, etc. In step 204, the data model and the specific parameter values are stored.

In step 206, the computer receives a signal requesting an optimization-sensitivity display function. In response, the computer generates and displays an optimization-sensitivity display having the general form of FIG. 3.

For purposes of clearly illustrating dynamic indexing, this section describes an example graphical user interface screen displays. However, the GUI displays described herein represent only selected examples of visualizations dynamic indexing described herein. In other embodiments, other graphical user interface displays may be used to interact with a user. Furthermore, no particular GUI is required and the disclosure is intended to encompass optimization and sensitivity analysis techniques independent of any GUI, and is not intended to be limited to any particular GUI or other form of display. For example, each example GUI merely represents one way to receive data input from a user for the data elements, parameters and values that are shown in the GUI, and represents only one way to display output resulting from the transformations and manipulations described herein; in other embodiments, programmatic methods may be used to obtain the same data elements, parameters and values and other forms of data output may be used such as logging, reporting, storing in database tables, storing in spreadsheets, or output using the GUI of another program or process.

Referring now to FIG. 3, in an embodiment, screen display 302 depicts a model representing a Strategy, which is a set of rules for when to buy and sell different market instruments for the purpose of making money. One measure of a Strategy's performance is it's "annualized return," which is the average percent return the strategy makes on its initial capital over all the years over which it operated or hypothetically operated. Thus, in screen display 302, the value function 310 of the data model is denoted "strategyAnnualizedReturn." In an embodiment, value function 310 is a text field that can receive user data input to specify any value function that has been previously defined in the system.

In an embodiment, screen display 302 comprises a parameter tree 304 that indicates the parameters of the model. In an embodiment, parameter tree 304 includes only parameters of the model that can receive variable values. Thus, in step 208 of FIG. 2, the computer determines which parameters are capable of variable values, and in step 210 the computer generates and causes the client computer to display the parameter tree in the screen display.

In an embodiment, the end user then decides which parameters to vary and drags labels for the parameters from the parameter tree 304 onto either the top of the comparison table 306 or the left part of the comparison table. In response, the computer re-generates the screen display 302 or portions of the screen display so that parameters 312, 314 are displayed. In the example of FIG. 3, the user dragged the standard deviation (stddev) parameter and the days parameter to the positions of parameters 312, 314 respectively.

In an embodiment, the user then enters ranges and increments for each of the parameters. In step 212 of FIG. 2, the computer receives signals identifying one or more parameters, and ranges, increments or explicit values for the parameters. In FIG. 3, the ranges, increments or explicit values are shown in association with parameters 312, 314. For example, the stddev parameter 312 has a low end value of "1.000", a high end value of "2.75", and an increment of "0.250".

Step 212 broadly represents determining a value selection approach for use in the process. One example of a value selection approach is receiving range values and an increment value for a parameter. Another example of a value selection approach is receiving explicit or enumerated values for a parameter. Another example, described further for FIG. 1C and FIG. 8, is receiving a probability distribution signal for a parameter and then using random number generation in step 214 to select and substitute values.

In step 214, the computer calculates a plurality of result values for the comparison table 306 by substituting each particular value of each of the parameters into the value function of the model or strategy and computing a result value. The result values are stored in table memory at step 216. At step 218, the computer generates and causes the client computer to display a comparison table of values and function values.

In this context and in the example of FIG. 3, "each particular value" in step 214 means each value obtained by starting at the low end value and incrementing by the increment value until the high end value is reached. The number of cells 308 in the comparison table 306 in a row and in a column is determined based on the number of values resulting from the incrementing. For example, the days parameter 314 has a low end value of "20", a high end value of "40" and an increment of 5, resulting in 5 cells 308 in each row for the values of 20, 25, 30, 35, and 40 as indicated by column header values 322. Row header values 324 are similarly incremented. Each cell 308 displays a result value derived from the value function after substituting in the different parameter values shown as the row header values and column header values.

Optionally, at step 220 the computer generates and causes the client computer to display the comparison table using colored shading in each cell 308. In an embodiment, cells holding negative values are colored red and cells holding positive values are colored green. In an embodiment, the color brightness, intensity or saturation level increases in proportion to the magnitude of a value in a cell. Thus, cells holding small negative numbers are pale red whereas cells holding large negative numbers are bright red; cells holding small negative numbers are pale green and a deep, saturated green may be used for cells with large positive numbers.

In an embodiment, the end user may inspect the comparison table to determine optimal values for the parameters and/or the sensitivity of the model to those parameters. For example, as seen in FIG. 3, an optimal value is in cell 316, which is recognizable for having the brightest green color and a worst or pessimal value is in cell 318, which can be recognized as having the brightest red color.

Further, region 320 comprising cells 316, 318 appears particularly sensitive to changes in the value of the standard deviation parameter 312 because small changes in the value of that parameter result in large changes in the result of the value function. In an embodiment, the computer automatically identifies which adjacent cells 308 have the greatest difference in the magnitude of the value obtained from the value function, and in response, the computer generates and causes displaying a notification message, alert, highlighting of the cells, or other indication that the identified adjacency, region or associated pair of cells indicates special sensitivity of the value function.

In the example of FIG. 3, one value function 310 is shown. In an alternative embodiment, multiple value functions 310 may be received, displayed, and used. In such an embodiment, each cell 308 would display multiple values resulting from evaluation of the multiple value functions. Various embodiments may use any number of value functions, so that output values of any number of value functions may be represented in cells of the table. Any number of parameter values may be used, shared on either or both of the X-axis and Y-axis associated with a table.

The computation performed at step 214 is different for each parameter type. Numeric parameters request a range and increment to determine the values to vary over, as just described for step 214 for the example of FIG. 3. In an embodiment, when Boolean parameters are used, then step 214 involves computing value function output for both values of the parameter (true and false). Similarly, when a parameter is an enumerated type, then step 214 involves computing the value function for each discrete value of the enumerated parameter. Date parameters use a start date, end date, and an increment, or a specific set of dates.

For other types of parameters, the user may hand-pick which values to use. For example, when the type of a parameter is Stock, the computer is configured to prompt the user to specify the stocks to include in the comparison table. FIG. 4 is example of a screen display showing a comparison table with a Stock parameter 402. In this case, the Strategy does not seem particularly sensitive to the "stddev" parameter 312, but it is sensitive to the choice of stock.

As described above for step 212 of FIG. 2, at step 212 the computer may receive signals representing selections of one or more parameters. In an embodiment, a user can choose as many parameters as desired. FIG. 5 shows a comparison table that uses a single parameter 502. FIG. 6 shows a comparison table that uses four (4) parameter values 602, 604, 606, 608. Thus, the comparison table may be n-dimensional and there are no particular bounds on the value n.

Referring again to FIG. 2, at step 222, a test is performed to determine whether a user or the client computer has provided a terminate signal. If so, then in step 224 an end operation is performed in which the process returns control to a previous process, ends operation of the computer, or terminates in any other desired manner. Alternatively control transfers to step 212 in which the computer may receive additional signals identifying parameters and ranges, increments or explicit values for the parameters. The process may repeat through steps 214, 216, 218, 220 in any number of iterations to support additional data analysis.

2.4 Randomized Parameter Values

FIG. 1C illustrates another example of internal logic and functional units of the optimization-sensitivity determining logic; FIG. 8 illustrates a machine-implemented method of generating and displaying a comparison table of values of a data model using random values that are automatically selected based on a probability distribution. Referring first to FIG. 1C, in an alternative embodiment, the optimization-sensitivity determining logic 104 comprises the elements of FIG. 1B and further comprises random value logic 170, which is configured to generate successive random values for parameters of a data model.

Referring to FIG. 8, in an alternative embodiment to FIG. 2, a process comprises steps 202, 204, 206, 208, 210 of FIG. 2, and thereafter at step 802 the computer receives signals identifying one or more parameters and a probability distribution for the parameters. For example, the probability distribution may be received in the form of a mean value and a standard deviation value. At step 804, the computer calculates result values by substituting randomly selected or generated values for each parameter into the value function of the model. Thus, the possible values over which to test the parameters are not defined specifically as a fixed list. Rather the possible values are assigned a probability distribution and particular concrete values are chosen at random.

Random value logic 170 may comprise or include a pseudo-random number generator or a random number generator. The particular kind of random generator is not critical; for example, various embodiments may use digital electronic hardware-based generators, a linear congruential generator, library functions such as /dev/random, CryptGenRandom, etc.

In an embodiment, at step 218 the computer may generate a comparison table as in FIG. 3, FIG. 4, FIG. 5, FIG. 6. Alternatively, the computer generates and causes displaying a scatterplot in which the x-axis is the value of the first parameter, the y-axis is the value of the second parameter, and each point represents a particular concrete instantiation of the model (with the first parameter assigned the x-value of the point and the second parameter assigned the y-value), and whose color (or size) is the value of the value function applied to that model. In another embodiment, a scatterplot is generated based on ignoring values of the input parameters and graphing two different value functions as the x- and y-axes. For example, the value functions strategyAnnualReturn and strategySharpeRatio may be used as the x- and y-axis respectively. Each point would still represent a single binding of all parameters, where such bindings are produced randomly. The user could then look for the point furthest toward the top-right of the scatterplot as a means of optimizing along two values functions at once.

In such a scatterplot, values of two parameters are shown in association with the x-axis and y-axis. Alternatively, it is possible to display visually the results of a simulation over more than two parameters or more than a single value function. In some embodiments, the computer is configured to search for the highest or lowest value or otherwise optimize or search for sensitivity over many dimensions at once, and identify locations of such values or sensitivity.

In the embodiments of FIG. 1C, FIG. 8, the user can create as many different models as desired by drawing from the probability distributions repeatedly and producing a different model (point on the scatterplot) and a different value function.

2.5 Benefits of Various Approaches

The various embodiments as described herein provide several useful benefits. For example, a build-first, extract-parameters-later approach is implemented that makes performing optimization or sensitivity analysis on a particular model easier than in past approaches because a user is not required to specify all the parameters to consider for analysis in advance, and the user is not forced to create the data model with those parameters in mind. Instead, a user can build the model in presently known concrete terms and optimize it later. The approach is also well suited to building models in a graphical user interface as opposed to in a programming language.

Embodiments are useful in the context of an object-oriented financial analysis environment. Each model may be defined using object-oriented techniques as an object, and objects can be constructed by combining simpler objects together into a more complicated tree structure, and parameters can be extracted for analysis from any level of the tree. An example object-oriented financial analysis system, and an object structure useful in such a system, are described in application Ser. No. 12/210,947, filed Sep. 15, 2008, entitled OBJECT MODELING FOR EXPLORING LARGE DATA SETS. In that disclosure, an object model is used to facilitate performing financial analysis and that includes certain zero-order objects or building blocks that lend themselves particularly well to doing financial analysis. The object model comprises a universe of data items, relationships between the data items, higher-order objects generated based on one or more data items in the universe, higher-order objects generated based on other objects, and auxiliary entities related to the universe of data items.

While embodiments above have described the use of value functions that generate numeric values, in an object-oriented financial analysis system of the type described in the '947 application, a value function may be any first-order object and need not generate a numeric value. For example, a value function can yield a chart, histogram, portfolio, or other result rather than a numeric value. Thus, the value function can perform complex operations on objects and the value function is not restricted to performing numeric operations. Further, a data model as described herein may be a "document" as defined the '947 application, and resulting objects shown in cells 308 can be reused in other operations.

Thus, each cell does not represent merely static data but a query that yields a dataset.

Embodiments also provide a particular user interface that features a multi-dimensional table, coloring that indicates the significance or magnitude of output values, dragging parameters to the rows and columns, and other features. The combination of features described herein for the GUI provides an efficient and complete mechanism for interacting with parameters and viewing results.

3.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    receiving first data identifying a value function comprising parameters, the value function producing a result value based on values for the parameters;
    storing a data model comprising the value function and specific parameter values for each of a plurality of the parameters for the value function;
    determining a set of variable parameters, of the value function, that are capable of taking variable values;
    receiving second data identifying selected parameters from the set of variable parameters;
    receiving third data specifying a different value selection approach for each particular parameter of the selected parameters;
    selecting substitute values for the selected parameters by, for each particular parameter of the selected parameters, selecting particular substitute values using the value selection approach that was specified for the particular parameter;
    identifying different combinations of the substitute values, each combination comprising, for each particular parameter of the selected parameters, a particular value from the particular substitute values identified for the particular parameter;
    determining a plurality of different result values for a plurality of different evaluations of the value function by, for each particular evaluation of the different evaluations, substituting a particular combination of substitute values, of the different combinations, in place of the specific parameter values for the selected parameters, and evaluating the value function using the particular combination of substitute values as input to the selected parameters;
    generating a table of the result values determined based on the different combinations of the substitute values, each cell of the table comprising at least one different result value for the value function, each row of the table corresponding to at least a different substitute value for a first parameter of the selected parameters, and each column of the table corresponding to at least a different substitute value for a second parameter of the selected parameters;
    wherein the preceding steps are performed by one or more computing devices.

2. The method of claim 1 wherein the value function yields as output result values that are charts, histograms, portfolios, or other results.

3. The method of claim 1 wherein receiving first data further comprises receiving a plurality of parameters for the value function, and one or more specific parameter values for one or more of the parameters.

4. The method of claim 1, wherein the third data specifies an upper range value, a lower range value, and an increment value for at least one of the selected parameters.

5. The method of claim 1, wherein the third data specifies one or more explicit or enumerated values for at least one of the selected parameters.

6. The method of claim 1, wherein the third data specifies a probability distribution for one or more of the selected parameters, and wherein the value selection approach further comprises determining a pseudo-randomly generated number for the one or more of the selected parameters.

7. The method of claim 1, wherein the data model is created in an object-oriented financial analysis environment.

8. The method of claim 1, wherein the first parameter is displayed in association with an X-axis of the table, wherein the second parameter and a third parameter are displayed in association with a Y-axis of the table, and wherein the table comprises a plurality of cells each displaying two result values.

9. The method of claim 1 wherein multiple selected parameters are displayed on either or both of the X-axis and Y-axis associated with the table.

10. The method of claim 1, further comprising receiving two or more value functions and wherein each cell of the table comprises two or more result values, each of the two or more result values determined from a different value function of the two or more value functions.

11. The method of claim 1, further comprising causing displaying the table using at least two colors, wherein a first color denotes positive values and a second color denotes negative values.

12. The method of claim 11, further comprising causing displaying the table using a plurality of cells each having different color saturation levels for each of the two colors.

13. The method of claim 12, wherein each different color saturation level is proportional to a magnitude of a number in the cells.

14. The method of claim 1, further comprising causing generating and displaying a notification identifying two adjacent cells in the table that have a greatest difference in magnitude of result values.

15. The method of claim 1, wherein the steps of receiving the first data, determining the set of variable parameters, receiving the second data, receiving the third data, determining the plurality of different result values, and generating the table are all performed after the step of storing the data model is complete.

16. The method of claim 1, wherein the one or more selected parameters are fewer in number than the parameters of the data model that are capable of taking variable values.

17. The method of claim 1, further comprising:
prior to receiving the second data, causing a first user interface control to be displayed on a user interface, wherein the first user interface control is for selecting one or more of the variable parameters;
receiving the second data responsive to a user selecting, through the first user interface control, the one or more selected parameters;
after receiving the second data and prior to receiving the third data, causing second user interface controls to be displayed on the user interface, one second user interface control for each of the selected parameters, the one second user interface control for selecting the value selection approach for the each selected parameter;
receiving the third data responsive to a user selecting, through the second user interface controls, the different value selection approach for each of the selected parameters.

18. The method of claim 17:
wherein each second user interface control is associated, in the user interface, with a different one of the selected parameters;
wherein each second user interface control is associated, in the user interface, with at most one of: (a) the columns or (b) the rows of the table.

19. The method of claim 1, further comprising:
displaying controls adjacent to the table, associated with the columns and/or rows of the table, configured to accept as input at least one of: an additional selected parameter, an alternative selected parameter, or an alternative value selection approach;
modifying the table to include at least different result values for different substitute values in response to receiving input to the controls.

20. A computer, comprising:
one or more processors;
table memory coupled to the one or more processors;
repository access logic coupled to the one or more processors;
optimization-sensitivity determining logic coupled to the one or more processors and comprising:
a model creating unit configured to receive first data identifying a value function comprising parameters, the value function producing a result value based on values for the parameters, the model creating unit further configured to store a data model comprising the value function and specific parameter values for each of a plurality of the parameters for the value function;
a variable parameter determining unit configured to determine a set of variable parameters, of the value function, that are capable of taking variable values;
a table display generating unit configured to: receive second data identifying selected parameters from the set of variable parameters; to receive third data specifying a different value selection approach for each particular parameter of the selected parameter; to select substitute values for the selected parameters by, for each particular parameter of the selected parameters, selecting particular substitute values using the value selection approach that was specified for the particular parameter; to identify different combinations of the substitute values, each combination comprising, for each particular parameter of the selected parameters, a particular value from the particular substitute values identified for the particular parameter; to determine a plurality of different result values for a plurality of different evaluations of the value function by, for each particular evaluation of the different evaluations, substituting a particular combination of substitute values, of the different combinations, in place of the specific parameter values for the selected parameters, and evaluating the value function using the particular combination of substitute values as input to the selected parameter; and to generate a table of the result values determined based on the different combinations of the substitute values, each cell of the table comprising at least one different result value for the value function, each row of the table corresponding to at least a different substitute value for a first parameter of the selected parameters, and each column of the table corresponding to at least a different substitute value for a second parameter of the selected parameters.

21. One or more non-transitory computer-readable media storing instructions which, when executed by one or more computing devices, cause performance of:
receiving first data identifying a value function comprising parameters, the value function producing a result value based on values for the parameters;
storing a data model comprising the value function and specific parameter values for each of a plurality of the parameters for the value function;
determining a set of variable parameters, of the value function, that are capable of taking variable values;
receiving second data identifying selected parameters from the set of variable parameters;
receiving third data specifying a different value selection approach for each particular parameter of the selected parameters;
selecting substitute values for the selected parameters by, for each particular parameter of the selected parameters, selecting particular substitute values using the value selection approach that was specified for the particular parameter;
identifying different combinations of the substitute values, each combination comprising, for each particular parameter of the selected parameters, a particular value from the particular substitute values identified for the particular parameter;
determining a plurality of different result values for a plurality of different evaluations of the value function by, for each particular evaluation of the different evaluations, substituting a particular combination of substitute values, of the different combinations, in place of the specific parameter values for the selected parameters, and evaluating the value function using the particular combination of substitute values as input to the selected parameters;

generating a table of the result values determined based on the different combinations of the substitute values, each cell of the table comprising at least one different result value for the value function, each row of the table corresponding to at least a different substitute value for a first parameter of the selected parameters, and each column of the table corresponding to at least a different substitute value for a second parameter of the selected parameters.

22. The one or more non-transitory computer-readable media of claim 21, wherein the value function yields as output result values that are charts, histograms, portfolios, or other results.

23. The one or more non-transitory computer-readable media of claim 21, wherein receiving first data further comprises receiving a plurality of parameters for the value function, and one or more specific parameter values for one or more of the parameters.

24. The one or more non-transitory computer-readable media of claim 21, wherein the third data specifies an upper range value, a lower range value, and an increment value for at least one of the selected parameters.

25. The one or more non-transitory computer-readable media of claim 21, wherein the third data specifies one or more explicit or enumerated values for at least one of the selected parameters.

26. The one or more non-transitory computer-readable media of claim 21, wherein the third data specifies a probability distribution for one or more of the selected parameters, and wherein the value selection approach further comprises determining a pseudo-randomly generated number for the one or more of the selected parameters.

27. The one or more non-transitory computer-readable media of claim 21, wherein the data model is created in an object-oriented financial analysis environment.

28. The one or more non-transitory computer-readable media of claim 21, wherein the first parameter is displayed in association with an X-axis of the table, wherein the second parameter and a third parameter are displayed in association with a Y-axis of the table, and wherein the table comprises a plurality of cells each displaying two result values.

29. The one or more non-transitory computer-readable media of claim 21 wherein multiple selected parameters are displayed on either or both of the X-axis and Y-axis associated with the table.

30. The one or more non-transitory computer-readable media of claim 21, wherein the instructions, when executed by one or more computing devices, further cause performance of receiving two or more value functions and wherein each cell of the table comprises two or more result values, each of the two or more result values determined from a different value function of the two or more value functions.

31. The one or more non-transitory computer-readable media of claim 21, wherein the instructions, when executed by one or more computing devices, further cause performance of causing displaying the table using at least two colors, wherein a first color denotes positive values and a second color denotes negative values.

32. The one or more non-transitory computer-readable media of claim 31, wherein the instructions, when executed by one or more computing devices, further cause performance of causing displaying the table using a plurality of cells each having different color saturation levels for each of the two colors.

33. The one or more non-transitory computer-readable media of claim 32, wherein each different color saturation level is proportional to a magnitude of a number in the cells.

34. The one or more non-transitory computer-readable media of claim 21, wherein the instructions, when executed by one or more computing devices, further cause performance of causing generating and displaying a notification identifying two adjacent cells in the table that have a greatest difference in magnitude of result values.

35. The one or more non-transitory computer-readable media of claim 21, wherein the steps of receiving the first data, determining the set of variable parameters, receiving the second data, receiving the third data, determining the plurality of different result values, and generating the table are all performed after the step of storing the data model is complete.

36. The one or more non-transitory computer-readable media of claim 21, wherein the one or more selected parameters are fewer in number than the parameters of the data model that are capable of taking variable values.

37. The one or more non-transitory computer-readable media of claim 21, wherein the instructions, when executed by one or more computing devices, further cause performance of:

prior to receiving the second data, causing a first user interface control to be displayed on a user interface, wherein the first user interface control is for selecting one or more of the variable parameters;

receiving the second data responsive to a user selecting, through the first user interface control, the one or more selected parameters;

after receiving the second data and prior to receiving the third data, causing second user interface controls to be displayed on the user interface, one second user interface control for each of the selected parameters, the one second user interface control for selecting the value selection approach for the each selected parameter;

receiving the third data responsive to a user selecting, through the second user interface controls, the different value selection approach for each of the selected parameters.

38. The one or more non-transitory computer-readable media of claim 37:

wherein each second user interface control is associated, in the user interface, with a different one of the selected parameters;

wherein each second user interface control is associated, in the user interface, with at most one of: (a) the columns or (b) the rows of the table.

39. The one or more non-transitory computer-readable media of claim 21, wherein the instructions, when executed by one or more computing devices, further cause performance of:

displaying controls adjacent to the table, associated with the columns and/or rows of the table, configured to accept as input at least one of: an additional selected parameter, an alternative selected parameter, or an alternative value selection approach;

modifying the table to include at least different result values for different substitute values in response to receiving input to the controls.

* * * * *

UNITED STATES PATENT AND TRADEMARK OFFICE
CERTIFICATE OF CORRECTION

PATENT NO.         : 8,484,549 B2
APPLICATION NO.    : 12/479554
DATED              : July 9, 2013
INVENTOR(S)        : Brandon Burr, Derek Cicerone and Kevin Simler Page 1 of 1

It is certified that error appears in the above-identified patent and that said Letters Patent is hereby corrected as shown below:

IN THE CLAIMS

COLUMN 18
Claim 20: Line 12: Delete "parameter" and insert --parameters--.
Line 29: Delete "parameter" and insert --parameters--.

Signed and Sealed this
Sixth Day of August, 2013

Teresa Stanek Rea
*Acting Director of the United States Patent and Trademark Office*